US007055060B2

(12) United States Patent
Nguyen et al.

(10) Patent No.: US 7,055,060 B2
(45) Date of Patent: May 30, 2006

(54) ON-DIE MECHANISM FOR HIGH-RELIABILITY PROCESSOR

(75) Inventors: Hang T. Nguyen, Tempe, AZ (US); Steven J. Tu, Phoenix, AZ (US); Alexander J. Honcharik, Holden, MA (US); Sujat Jamil, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 323 days.

(21) Appl. No.: 10/324,957

(22) Filed: Dec. 19, 2002

(65) Prior Publication Data

US 2004/0123201 A1    Jun. 24, 2004

(51) Int. Cl.
    G06F 11/00    (2006.01)
    G06F 7/02     (2006.01)
    G01R 31/28    (2006.01)

(52) U.S. Cl. .......................... 714/11; 714/724; 714/819

(58) Field of Classification Search ................ 714/819, 714/703, 724, 820, 821, 10, 11, 13, 15, 21, 714/24, 31, 48, 25, 37, 44, 47; 710/240, 710/244, 241, 242
See application file for complete search history.

(56) References Cited

U.S. PATENT DOCUMENTS

| | | | |
|---|---|---|---|
| 3,701,972 A | 10/1972 | Berkeley et al. | |
| 4,012,717 A | 3/1977 | Censier et al. | |
| 4,325,120 A | 4/1982 | Colley et al. | |
| 5,155,856 A | 10/1992 | Bock et al. | |
| 5,163,155 A | 11/1992 | Omiya | |
| 5,260,950 A | 11/1993 | Simpson et al. | |
| 5,689,632 A | * 11/1997 | Galy et al. ................ 714/11 |
| 5,758,058 A | 5/1998 | Milburn | |
| 5,862,373 A | 1/1999 | Pathikonda et al. | |
| 5,915,082 A | 6/1999 | Marshall et al. | |
| 5,935,266 A | 8/1999 | Thurnhofer et al. | |
| 6,061,599 A | 5/2000 | Rhodehamel et al. | |
| 6,114,887 A | 9/2000 | Pathikonda et al. | |
| 6,125,463 A | 9/2000 | Macchi | |
| 6,173,351 B1 | 1/2001 | Garnett et al. | |

(Continued)

FOREIGN PATENT DOCUMENTS

WO    WO 01/46806    6/2001

OTHER PUBLICATIONS

Joel M. Tendler, Steve Dodson, Steve Fields, Hung Le, Balaram Sinharoy, IBM Server Group, IBM eserver, POWER4 System Microarchitecture, Technical White Paper, Oct. 2001, pp. 1-33.

(Continued)

*Primary Examiner*—Christine T. Tu
(74) *Attorney, Agent, or Firm*—Blakely, Sokoloff, Taylor & Zafman LLP

(57) ABSTRACT

A processor includes first and second execution cores that operate in a redundant (FRC) mode, an FRC check unit to compare results from the first and second execution cores, and an error check unit to detect recoverable errors in the first and second cores. The error detector disables the FRC checker, responsive to detection of a recoverable error. A multi-mode embodiment of the processor implements a multi-core mode in addition to the FRC mode. An arbitration unit regulates access to resources shared by the first and second execution cores in multi-core mode. The FRC checker is located proximate to the arbitration unit in the multi-mode embodiment.

16 Claims, 8 Drawing Sheets

U.S. PATENT DOCUMENTS

| | | | |
|---|---|---|---|
| 6,357,024 B1 * | 3/2002 | Dutton et al. | 714/45 |
| 6,393,582 B1 * | 5/2002 | Klecka et al. | 714/11 |
| 6,615,366 B1 * | 9/2003 | Grochowski et al. | 714/10 |
| 6,625,749 B1 | 9/2003 | Quach | |
| 6,625,756 B1 | 9/2003 | Grochowski et al. | |
| 6,640,313 B1 | 10/2003 | Quach | |
| 6,708,304 B1 | 3/2004 | Tsukimori et al. | |

OTHER PUBLICATIONS

David J.C. Johnson, Fort Collins Microprocessor Lab, HP's Mako Processor, Oct. 16, 2001, 16 pages.

Sun Microelectronics, MicroSPARC-IIep, Introduction to JTAG Boundary Scan, White Paper Jan. 1997 (10 pgs).

Joel M. Tendler, Steve Dodson, Steve Fields, Hung Le, Balaram Sinharoy, IBM Server Group, IBM eserver, POWER4 System Microarchitecture, Technical White Paper, Oct. 2001, pp. 1-33.

David J.C. Johnson, Fort Collins Microprocessor Lab, HP's Mako Processor, Oct. 16, 2001, 16 pgs.

* cited by examiner

ON-DIE MECHANISM FOR HIGH-RELIABILITY PROCESSOR

BACKGROUND OF THE INVENTION

1. Technical Field

The present invention relates to microprocessors and, in particular, to mechanisms for handling errors in FRC-enabled processors.

2. Background Art

Servers and other high-end computing and communication systems are designed to provide high levels of reliability and availability. Soft errors pose a major challenge to both of these properties. Soft errors result from collisions between high-energy particles, e.g. alpha particles, and charge storing nodes. They are prevalent in storage arrays, such as caches, TLBs, and the like, which include large numbers of charge storing nodes. They also occur in random state elements and logic. Rates of occurrence of soft errors (soft error rates or SERs) will likely increase as device geometry decreases and device densities increase.

Highly reliable systems include safeguards to detect and manage soft errors, before they lead to silent, e.g. undetected, data corruption (SDC). However, to the extent error detection/handling mechanisms that support high-reliability operations take a system away from its normal operations, the system's availability is reduced. For example, one such mechanism resets the system to its last known valid state if an error is detected. The system is unavailable to carry out its assigned task while it is engaged in the reset operation.

One well-known mechanism for detecting soft errors is functional redundancy checking (FRC). A single processor enabled for FRC may include replicated instruction execution cores on which the same instruction code is run. Depending on the particular embodiment, each replicated execution core may include one or more caches, register files and supporting resources in addition to the basic execution units (integer, floating point, load store, etc.). FRC-hardware compares results generated by each core, and if a discrepancy is detected, the FRC system passes control to an error-handling routine. The point(s) at which results from different execution cores are compared represents the FRC-boundary for the system. Errors that are not detected at the FRC boundary can lead to SDC.

Since FRC errors indicate only that the execution cores disagree on a result, FRC errors are detectable but not recoverable. As noted above, the FRC error handling routine typically resets the system to the last known point of reliable data. This reset mechanism is relatively time consuming. It takes the system away from its normal operations, reducing system availability.

FRC is only one mechanism for handling soft errors, and for random logic and random state elements, it is the primary mechanism. Array structures present a different picture. Array structures typically include parity and/or ECC hardware, which detect soft errors by examining properties of the data. In many cases, the system can correct errors created by data corruption using relatively fast hardware or software mechanisms. However, for FRC-enabled processors, such errors are likely to be manifested as FRC errors, since they take the execution cores out of lock-step. Handling these otherwise recoverable errors through a reset mechanism reduces system availability.

The present invention addresses mechanisms for combining recoverable and non-recoverable error handling mechanisms efficiently in FRC-enabled processors.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention. For example, aspects of the present invention are illustrated using a dual-core processor, but persons skilled in the art will recognize that more than two cores may be used with appropriate modifications of the reset and recovery mechanisms.

Figure 1:
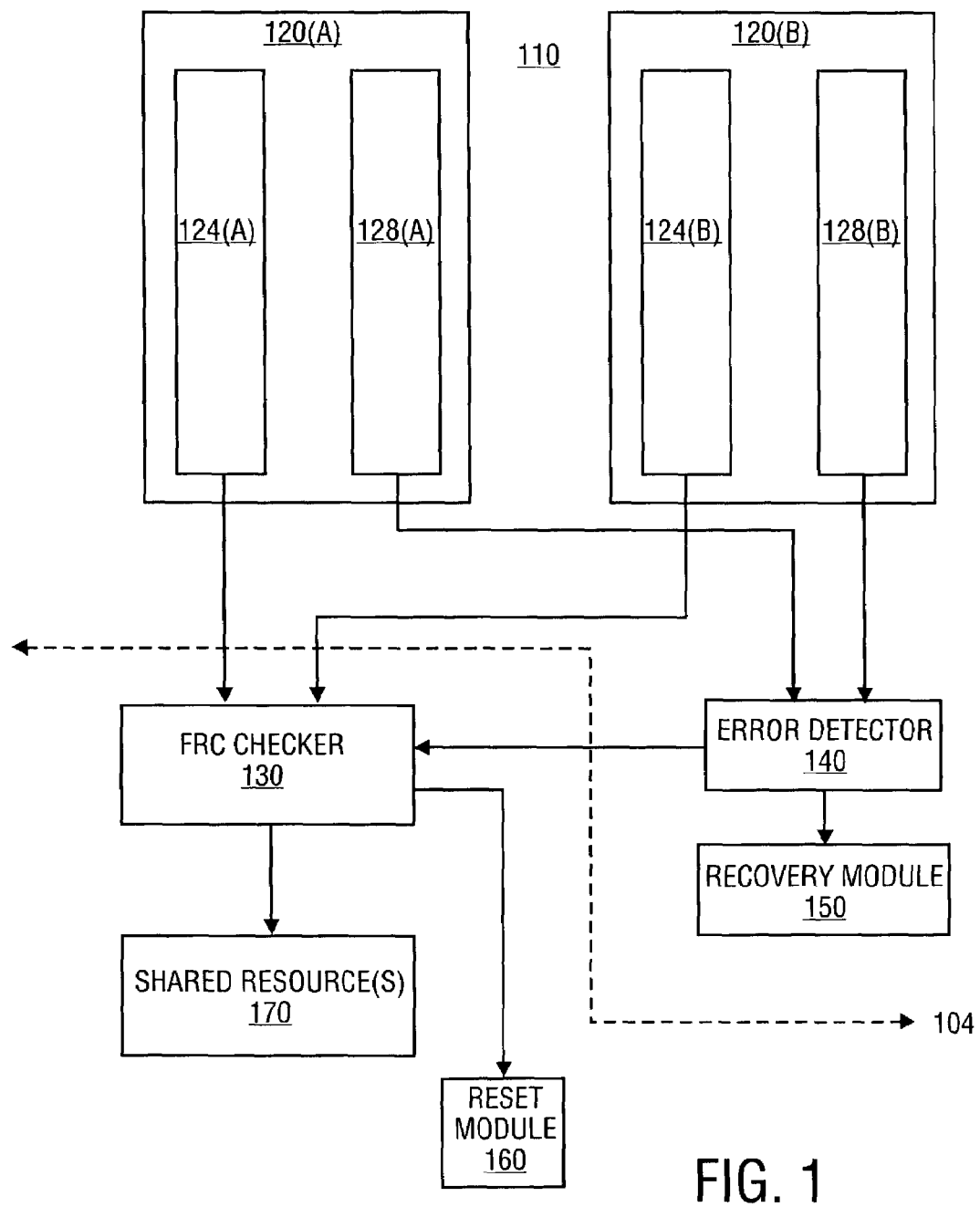
FIG. 1 is a block diagram of a processor including dual execution cores and FRC-detection and handling logic.

FIG. 1 is a block diagram representing one embodiment of an FRC-enabled processor 110 in accordance with the present invention. Processor 110 includes first and second execution cores 120(a), 120(b) (generically, execution core 120), an FRC checker 130, an error detector 140, a recovery module 150, a reset module 160, and shared resources 170. A portion of the FRC-boundary is indicated by dashed line 104. For purposes of illustration, recovery module 150 and reset module 160 are shown as part of processor 110. These modules may be implemented in whole or in part as hardware, firmware or software and located on or off of the processor die. Similarly, shared resources 170 may include components that are on the processor die as well as components that are on one or more different die.

Each execution core 120 includes a data pipeline 124 and an error pipeline 128 that feed into FRC checker 130 and error detector 140, respectively. Data pipeline 124 represents the logic that operates on various types of data as it moves through processor 110 toward FRC checker 130. Data processed by data pipeline 124 may include result operands, status flags, addresses, instructions and the like that are generated and staged through processor 110 during code execution. Error pipeline 128 represents the logic that operates on various types of data to detect errors in the data and provide appropriate signals to error detector 140. For example, the signals may be one or more bits (flags) representing the parity or ECC status of data retrieved from various storage arrays (not shown) of processor 110. Soft errors in these arrays may appear as parity or ECC error flags when the corrupted data is accessed.

If an error reaches error detector 140 from either core 120, recovery module 150 is activated to implement a recovery routine. Recovery can be implemented with relatively low latency by hardware, software, firmware or some combination of these. For example, there is an extremely small probability that data is corrupted in both execution cores 120 at the same (or nearly the same) time. This leaves an uncorrupted copy of the data available to restore data integrity to processor 110. However, an FRC error will be triggered if the corrupted data from one execution core and an uncorrupted version of the data from the other execution are allowed to reach FRC checker 130 before recovery module 150 is activated. Since FRC errors are not recoverable, reset module 160 resets the system, if FRC checker 130 signals an FRC error before the underlying parity/ECC error is detected.

Not all FRC-errors are traceable to underlying parity/ECC or other correctible soft errors. For those that are, it is faster for error detector 140 to address the underlying soft error than for FRC-checker to address the FRC error that results when the corrupted data reaches FRC boundary 104. As noted above, the reset process has a significantly longer latency than the recovery process, and it is to be avoided if the error can be corrected by recovery module 150. In addition, reset usually brings the entire system down, whereas recovery only results in a temporary performance loss. For this reason, FRC checker 130 is temporarily disabled if error detector 140 detects an error in either error pipeline 128, since execution cores 120 are no longer in lock step.

Execution cores 120 operate in lock step during normal FRC mode, but data pipeline 124 and error pipeline 128 may operate relatively independently. For example, ECC hardware is relatively complex and, consequently, relatively slow, especially for 2-bit errors. A flag signaling such an error may reach error detector 140 before, after, at the same time as the data with which it is associated reaches FRC checker 130. This flexibility is generally beneficial. For example, it allows data to be used speculatively before its error status is determined. Since soft errors are relatively rare, and error pipeline 128 is generally as fast as data pipeline 124, this flexibility is net positive. As long as the error flag arrives at error detector 140 in time to disable FRC checker 130 before it acts on a mismatch attributable to the corrupted data, the relatively low latency recovery routine is engaged.

As discussed below, processor 110 may implement strategies to mitigate the race between recoverable and non-recoverable error mechanisms. For example, a streamlined signaling mechanism may be used in FRC mode to speed disabling of FRC checker 130 in the event of a non-FRC error. In addition, FRC errors may be delayed for an interval prior to reset, in case a late arriving recoverable error signal obviates the need for reset.

For one embodiment of the invention, processor 110 is capable of operating in a high reliability (e.g. FRC) mode or a high performance (e.g. multi-core) mode. The operating mode may be selected, for example, when a computing system that includes processor 110 is booted or reset. In FRC mode, execution cores 120(a) and 120(b) may appear to the operating system as a single logical processor. Execution cores 120(a) and 120(b) process the same code sequence, and the results generated are compared by FRC checker 130. If the results agree, a machine state corresponding to the code sequence is updated.

In FRC mode, one of execution cores 120 may be designated as the master. The master refers to the execution core that is responsible for updating the resources shared by execution cores 120. The other execution core 120 may be designated as the slave. The slave is responsible for generating results from the same code sequence to be checked against those of the master. Since an error may occur in either the master or slave, embodiments of the present invention allow the master/slave designation to be changed dynamically. As discussed below, this allows the slave to take over the master designation to implement recovery if a recoverable error is detected in the execution core that is currently designated as master.

In multi-core mode, execution cores 120(a) and 120(b) may appear to the operating system as two different logical processors on a single processor die. In this mode, execution cores 120(a) and 120(b) process different code sequences, and each updates a machine state associated with the code sequence it processes. Portions of the machine state of a logical processor may be stored in a cache and/or register associated with the corresponding execution core. At some point(s) on the processor die, results from execution cores 120(a) and 120(b) are routed to shared resource(s) 170 for, e.g., storage (cache) or transmission off of the processor die (bus). For this embodiment, additional logic is provided to mediate access to shared resources 170 by execution cores 120(a) and 120(b). In general, multi-core mode allows the execution cores of the processor to be controlled separately.

Figure 2:
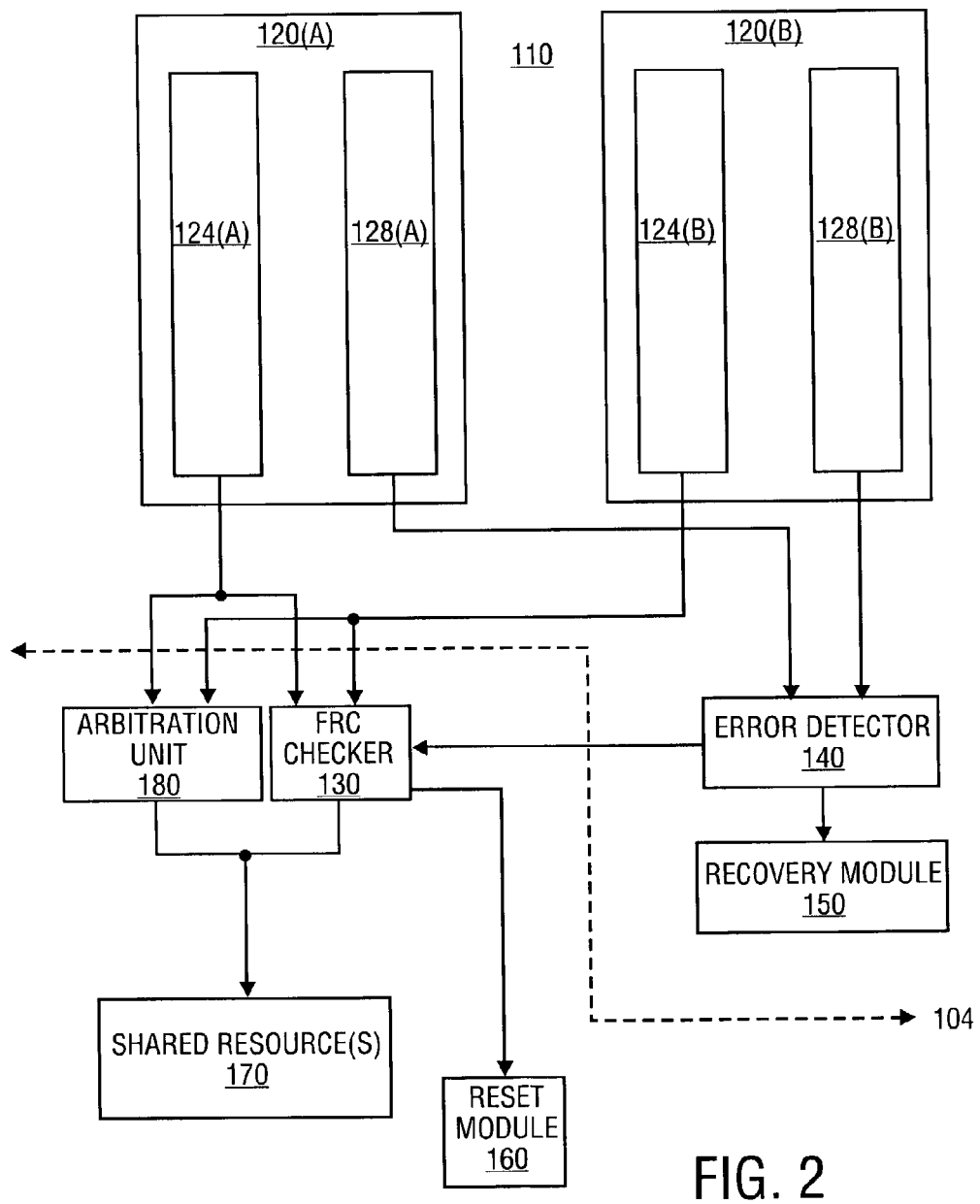
FIG. 2 is a block diagram of an embodiment of the processor of FIG. 1 that is capable of operating in multiple modes.

FIG. 2 is a block diagram representing an embodiment of processor 110 that is capable of operating in multiple modes, e.g. FRC mode and multi-core mode. For the disclosed embodiment, an arbitration unit 180 is provided to manage transactions to shared resources 170 by execution cores 120(a) and 120(b), when processor 110 operates in multi-core mode. Arbitration unit 180 is associated with FRC unit 130, placing the arbitration point for multi-core mode operation proximate to the FRC boundary for FRC mode operation. In multi-core mode, signals from execution cores 120, e.g. transaction request signals, may be processed by arbitration unit 180, which manages access to shared resource(s) 170. In FRC mode, signals from execution cores 120 may be processed by FRC checker 130, which compares them to detect soft errors in either execution core. Locating FRC checker 130 and arbitration unit 180 in close proximity expands the FRC boundary to encompass most, if not all, of the logic for which signals from the two execution cores remain distinct. It also reduces the wiring necessary to support processor 110 in FRC and multi-core modes.

Expansion of the FRC boundary in this manner naturally increases the time necessary to propagate signals to FRC checker 130. This increased "flight time" provides more time for a parity or ECC error to reach detector 140, which increases the opportunity for error recovery. As noted above, the recovery routine triggered by error detector 140 provides greater system availability than the reset routine triggered by FRC checker 130. Expanding the FRC boundary thus increases both the amount of logic that is duplicated for execution cores 120 and the flight time, during which detectable errors may be identified. The former increases FRC protection, albeit through a reset mechanism. The latter increases the likelihood that errors identifiable through parity, ECC or similar core-specific protections are handled through recovery rather than reset.

Figure 3A:
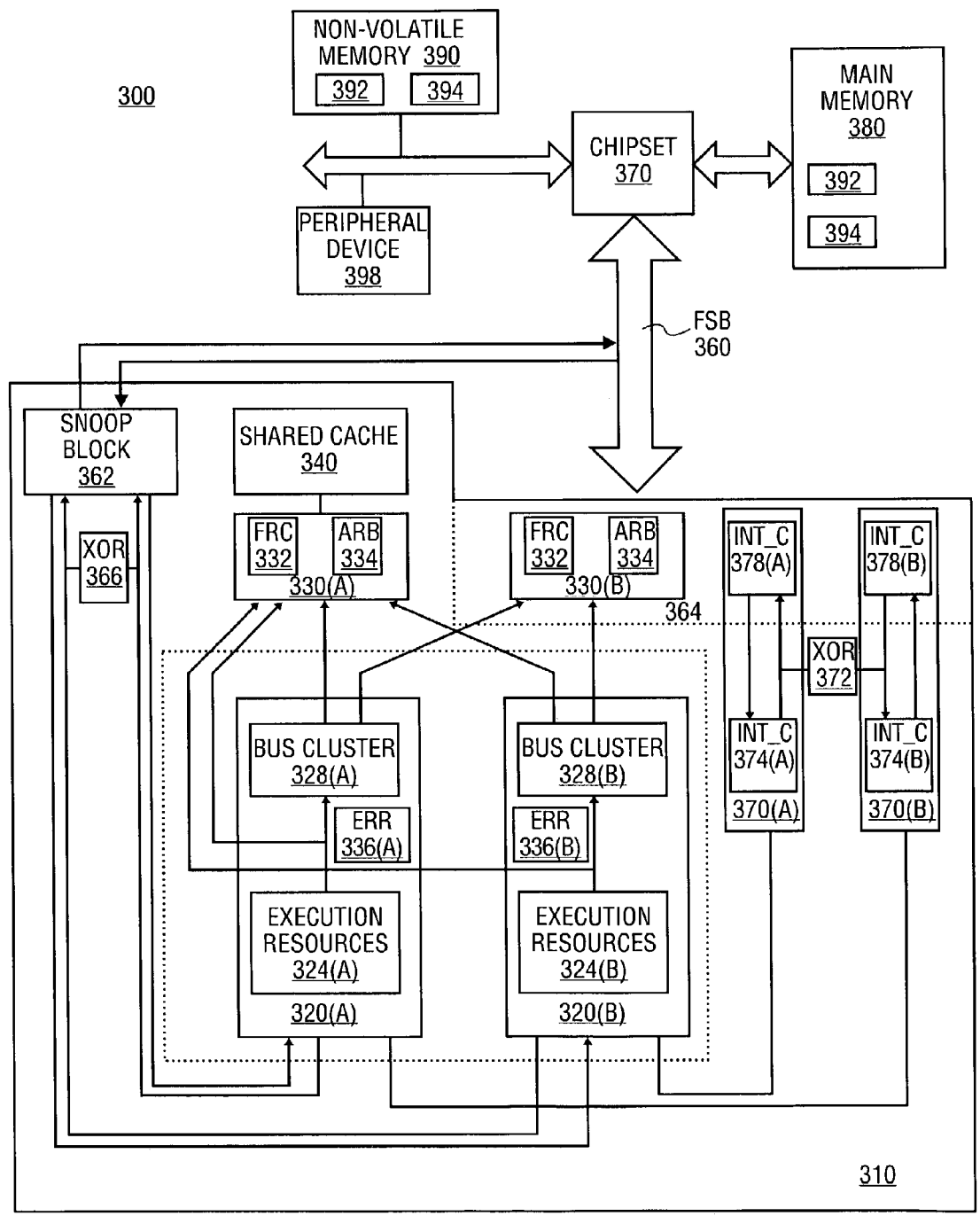
FIG. 3A is a block diagram of one embodiment of a computing system that implements the multi mode processor of FIG. 2.

FIG. 3A is a block diagram representing one embodiment of a computing system 300 in accordance with the present invention. The disclosed embodiment of system 300 includes a processor 310, chipset 370, main memory 380, non-volatile memory 390 and peripheral device(s) 398. For the disclosed embodiment of system 300, processor 310 may be operated in FRC mode or in multi-core mode. The mode may be selected, e.g., when computing system 300 is booted or reset. Chipset 370 manages communications among processor 310, main memory 380, non-volatile memory 390 and peripheral devices 398.

Processor 310 includes first and second execution cores 320(a) and 320(b), respectively (generically, execution cores 320). Each execution core includes execution resources 324 and a bus cluster 328. Execution resources 324 may include, for example, one or more integer, floating point, load/store, and branch execution units, as well as register files and cache(s) to supply them with data (e.g. instructions, operands, addresses). Bus cluster 328 represents logic for managing transactions to a cache 340 that is shared by execution cores 320(a) and 320(b), as well as to a front side bus 360, for those transactions that may miss in shared cache 340. Resources corresponding to the error pipeline of FIGS. 1 and 2 may be associated with execution resources 324 and/or bus cluster 328.

Interface units (IFU) 330(a), 330(b) (generically, IFU 330) represent a boundary between execution cores 320 and shared resources, cache 340 and FSB 360. The disclosed embodiment of IFU 330 includes an FRC unit 332 and an arbitration unit 334. As noted above, FRC unit 332 and arbitration unit 334 receive signals from execution cores 320, and locating them proximate to each other results in significant savings of wiring on the processor die. Also shown in FIG. 3A are error units 336(a) and 336(b), which include components to monitor for detectable errors in execution cores 320(a) and 320(b).

For FRC mode, FRC unit 332 compares signals from execution cores 320 for transactions to shared resources like cache 340 and FSB 360. FRC unit 332 thus forms part of the FRC boundary of processor 310. For multi-core mode, arbitration unit 334 monitors signals from execution cores 320 and grants access to its associated shared resource according to an arbitration algorithm. The arbitration algorithm implemented by arbitration unit 334 may be, for example, a round robin scheme, a priority-based scheme or similar arbitration algorithms. For both FRC and multi-core mode, error unit 336 may monitor signals from execution cores 320 for recoverable errors.

Portions of recovery module 150 and reset module 160 (FIG. 2) may be located on processor 310 or elsewhere in system 300. For one embodiment, a recovery routine 392 and a reset routine 394 may be stored in non-volatile memory 390 and images of these routines may be loaded in main memory 380 for execution. For this embodiment, recovery module 150 and reset module 160 may include pointers to recovery routine 392 and reset-routine 394, respectively (or their images in main memory 380).

The disclosed embodiment of system 300 also includes interrupt controllers 370(a) and 370(b) (generically, interrupt controller(s) 370) to process interrupts for execution cores 320(a) and 320(b), respectively. Each interrupt controller 370 is shown having first and second components 374 and 378, respectively, to accommodate the different clock domains in which interrupt controller 370 may operate. For example, FSB 360 typically operates at a different frequency than processor 310. Consequently, components of processor 310 that interact directly with FSB 360 typically operate in its clock domain, which is indicated as area 364 on processor 310.

The disclosed embodiment of interrupt controller 370 also includes an FRC-boundary-like component in the form of XOR 372. XOR 372 signals an FRC error if it detects a mismatch between outgoing signals, e.g. interrupt responses, of components 374(a) and 374(b) from execution cores 320(a) and 320(b). Errors attributable to interrupt controllers 370 may still arise, however, from soft errors in components 378(a), 378(b) in FSB clock domain 364. These error may be detected by the discrepancies they introduce between the subsequent operations of execution cores 320(a) and 320(b).

For the disclosed embodiment of system 300, a common snoop block 362 processes snoop transactions to and from execution cores 320(a) and 320(b). XOR 366 provides FRC-checking on snoop responses from execution cores 320(a), 320(b) and signals an error if a mismatch is detected. XORs 372 and 366 may be disabled if processor 310 is operating in multi-core mode.

Figure 3B:
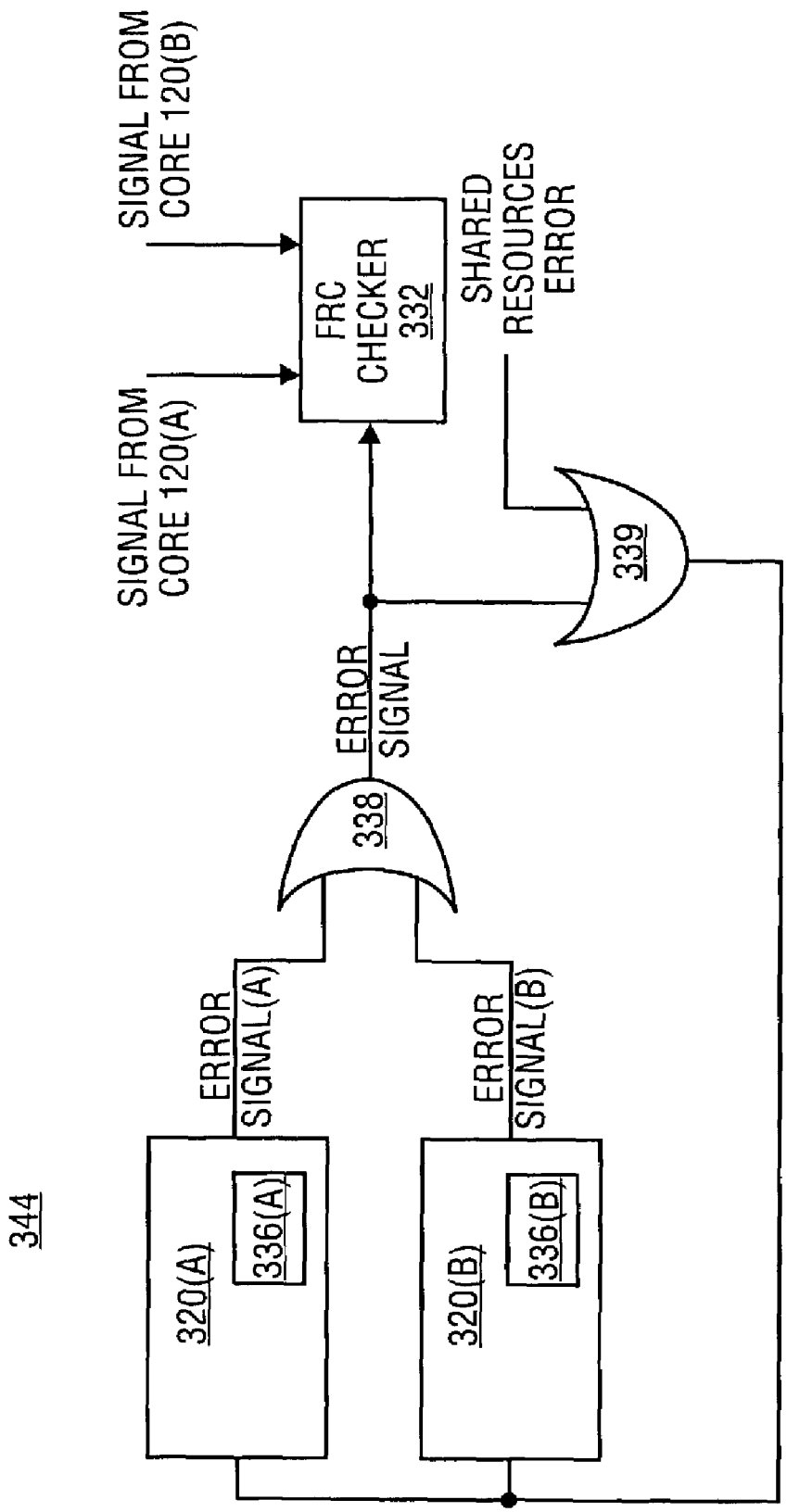
FIG. 3B is a block diagram of a mechanism for signaling recoverable errors in the computing system of FIG. 3A.

FIG. 3B is a block diagram representing one embodiment of an apparatus 344 for broadcasting-recoverable error conditions to components of computing system 300. For example, error units 336(a) and 336(b) may represent ECC or parity error detection logic for various arrays (register, caches, buffers, etc) of execution cores 320(a) and 320(b), respectively, and/or exception logic to handle these errors. An OR gate 338 monitors error signals from execution cores 320 and asserts a signal to disable FRC unit 332 if either error signal is asserted. The error signal may be a high level interrupt, such as the machine check abort (MCA) defined for Itanium® processors. The output of OR gate 338 is also fed back to execution cores 320 to indicate to the error-free execution core that a recovery mechanism is to be initiated. A second OR gate 339 is provided to transfer error signals to execution cores 320 from the shared resources.

If the error signal does not disable FRC unit 332 the corrupted data triggers an FRC error, and an otherwise recoverable error is treated as a non-recoverable, e.g. FRC, error. That is, the system goes through a reset operation rather than a shorter recovery operation. Depending on the particular implementation of the system, there may be a number of cases in which the race to FRC unit 332 between the error signal and the mismatched data signals from the execution cores (created by the recoverable error) is close. For this reason, apparatus 344 may include a mechanism to accelerate error signal propagation, at least in FRC mode.

For one embodiment, apparatus 334 supports a high level interrupt such as an MCA that operates in both FRC and high performance modes. In high performance mode, the error signal is subject to pipeline stalls, e.g., in the front end of the execution core or in the L2 cache. This ensures that no unnecessary MCAs are taken, since the event that triggered the stall may make the error signal moot. In FRC mode, the error signal bypasses these stalls. Bypassing stalls in FRC may result in the processing of some unnecessary error signals, but it also reduces the probability that an FRC error is triggered before the (non-FRC) error signal disables FRC unit 332. As discussed in conjunction with FIG. 7, embodiments of processor 110 may also include a hardware mechanism to mitigate the race between the error signal and the core signals that reflect the corrupted data.

Figure 4:
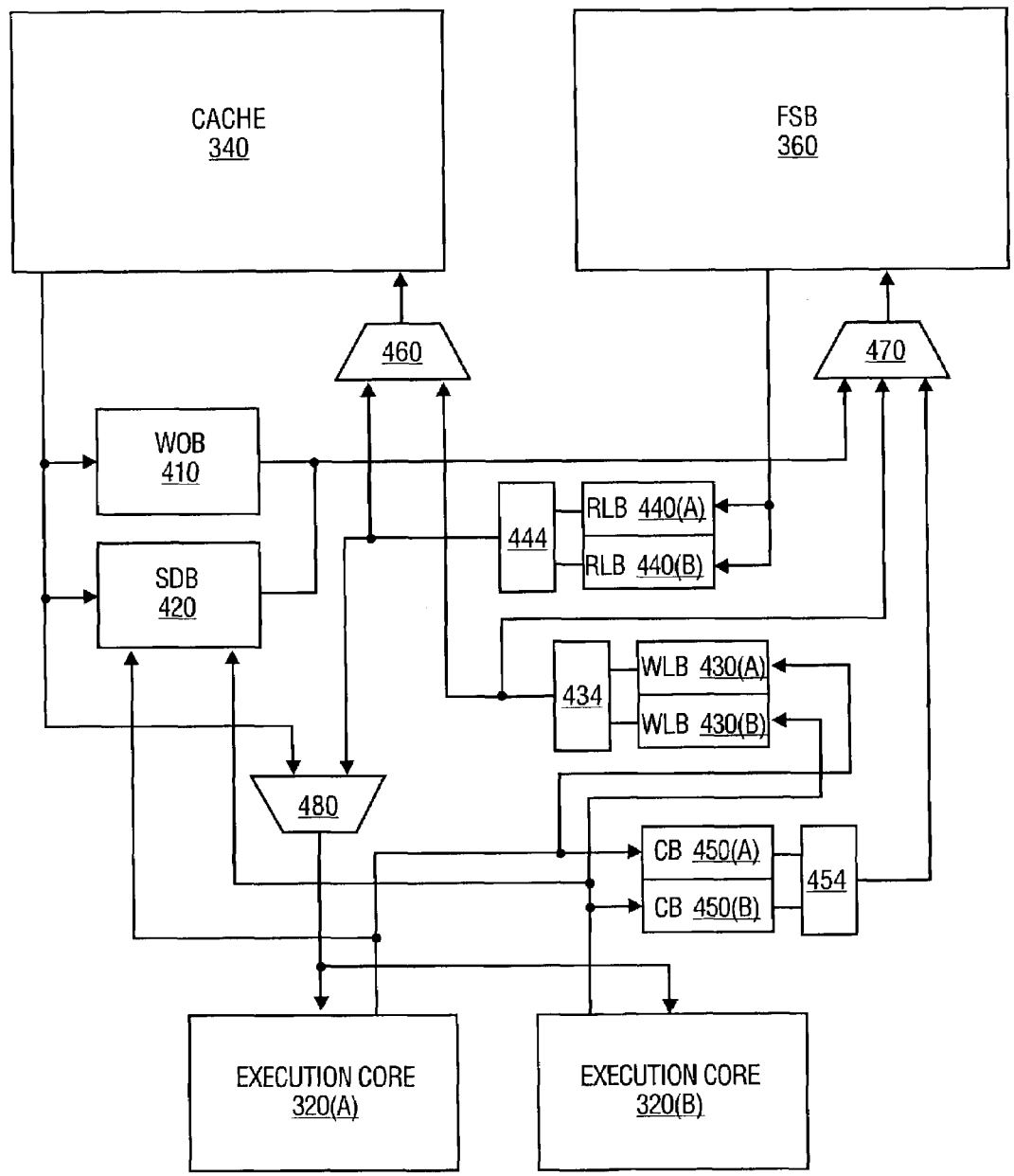
FIG. 4 is a block diagram representing the data paths of the computing system of FIG. 3A.

FIG. 4 is a block diagram representing data paths for one embodiment of computing system 310, including FRC components to support processor 310 in FRC mode. For the disclosed embodiment, cache 340, FSB 360 and execution cores 320 are coupled through a series of buffers. For example, a write-out buffer (WOB) 410 stages data evicted from cache 340 to main memory 380, and a snoop data buffer (SDB) 420 provides snoop data from execution cores 320 or cache 340 to FSB 360, responsive to a snoop hit in these structures (Execution cores 320 may each have one or more levels of cache in addition to shared cache 340).

A pair of write-line buffers (WLB) 430(a), 430(b) stage data from execution cores 320(a), 320(b), respectively, to cache 340 or FSB 360, and a pair of read-line buffers 440(a), 440(b) stage data from FSB 360 to cache 340 or execution cores 320. Coalescing buffers (CB) 450(a), 450(b) collect data to be written to memory 380 and forward it to FSB 360, periodically. For example, multiple data writes to the same line of memory may be collected in CBs 450 before triggering a write transaction on FSB 360.

For the disclosed embodiment, logic associated with these buffers provides the FRC-checking and data routing functions when processor 310 is operated in FRC mode. For example, logic block 454 represents MUX and XOR functions for data in CBs 450(a), 450(b). The XOR function provides FRC checking if processor 310 is operating in FRC mode. The MUX function provides data routing if processor is operating in multi-core mode. Logic blocks 434 and 444 provide similar functions for data in WLBs 430(a), 430(b) and RLBs 440(a), 440(b), respectively. MUXs 460, 470 and 480 route data from different sources to cache 340, FSB 360 and execution cores 320.

As noted above, the recovery mechanism for errors detected within the FRC boundary may be handled by various combinations of hardware, software and firmware modules. One embodiment of the recovery mechanism employs code that is closely associated with the processor. For example, the Itanium® Processor Family of Intel® Corporation, employs a layer of firmware called the processor abstraction layer (PAL), which provides an abstraction of the processor to the rest of the computing system. Implementing recovery in the PAL hides the recovery process from system level code, such as the system abstraction layer (SAL), e.g. BIOS, and the operating system. PAL-based implementations of the recovery mechanism should be able to complete quickly enough to avoid triggering a time-out period enforced by the operating system. Recovery mechanisms may also be implemented using system level code, e.g. SAL/BIOS, or operating system code. The latter implementations may not be subject to the same time constraints as the PAL-based implementation. Unless otherwise noted, the recovery mechanisms discussed below may be implemented using code associated with any of the foregoing sources.

Figure 5:
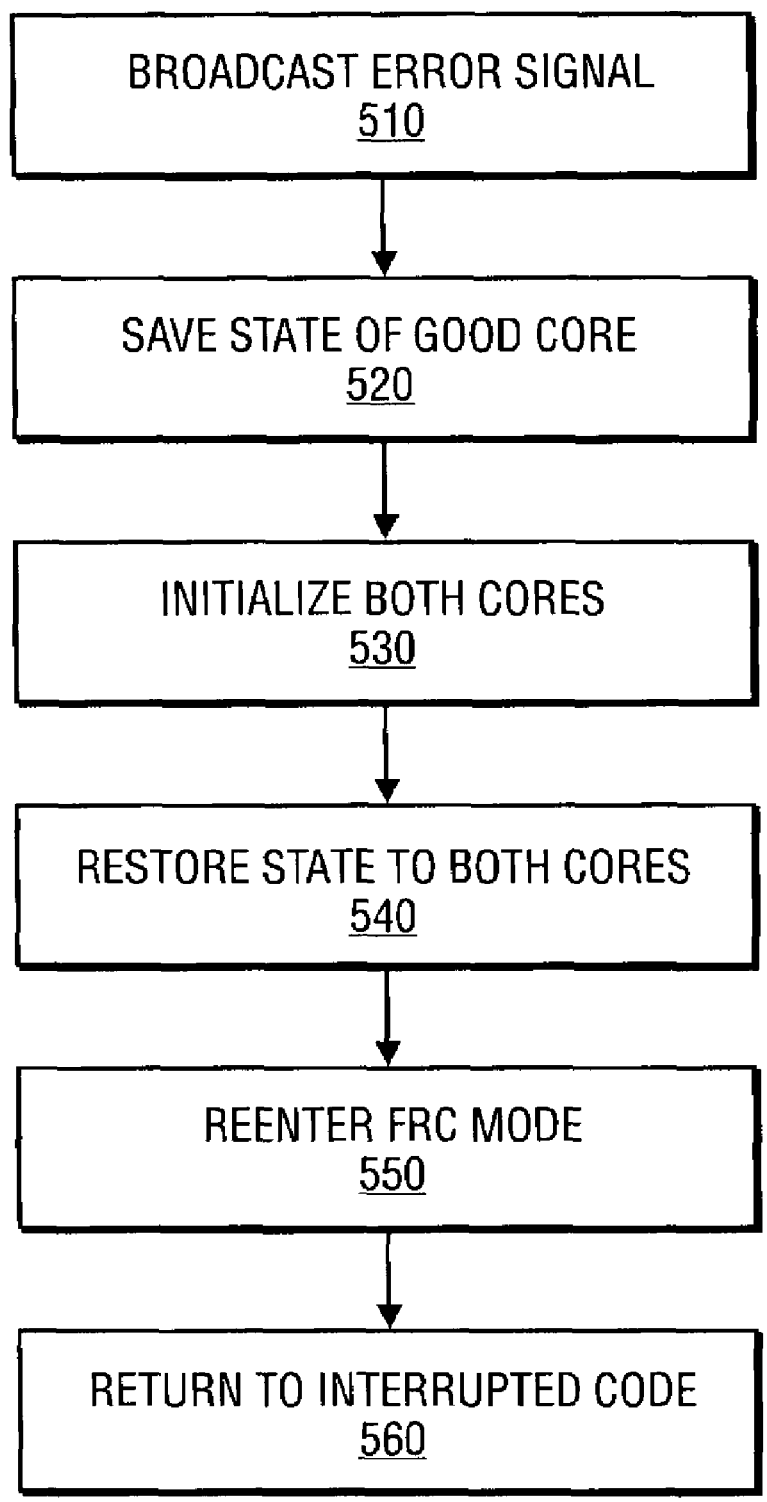
FIG. 5 is a flowchart representing one embodiment of a mechanism for recovering from soft error in an execution core.

FIG. 5 is a flowchart representing a mechanism for recovering from an error detected in one of the execution cores before it triggers an FRC reset. Responsive to a parity, ECC or other error detected in one of the execution cores, a signal is broadcast 510 to indicate the start of a recovery routine. As long as the error is detected before it triggers an FRC reset, the corrupted data can be localized to one of the execution cores, leaving the machine state data of the other execution core available for recovery. Accordingly, the machine state of the good core is saved 520. To prepare the processor for recovery, both cores are initialized 530 to a specified condition, and the saved machine state is restored 540 to the initialized cores. FRC mode is then restored 550 and the processor returns 560 to the interrupted code.

For one embodiment of the invention, one of execution cores 120 may be designated as the master core and the other as the slave core when processor 10 is operating in FRC mode. For this embodiment, signals generated by the master and slave cores are compared at the FRC boundary to determine if reset is necessary. If no FRC reset is warranted, signals generated by the master core are transferred to shared resource(s) 170, and signals generated by the slave core are dropped. For this embodiment, a bit in a status register of each execution core 120 may be used to indicate its status as master or slave. The bit may be set, for example, when the system is booted or reset. As discussed below in greater detail, the master/slave status of an execution may also be changed dynamically to allow recovery for an error in either core. For errors detected within the FRC boundary, e.g. recoverable errors, the actions of the master and slave core may differ, depending on which core generated the error.

Figure 6:
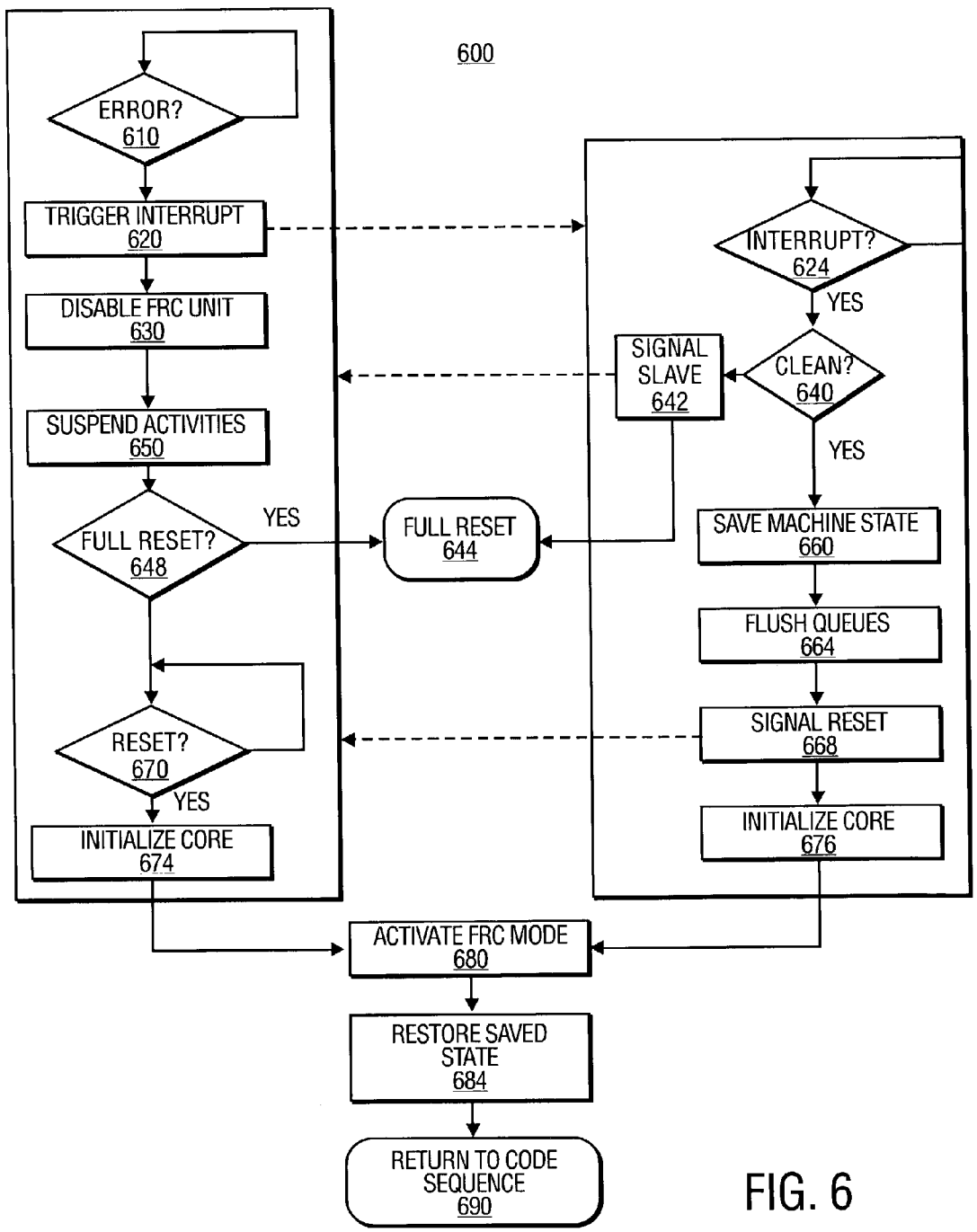
FIG. 6 is a flowchart representing one embodiment of a mechanism for recovering from a soft error in a multi execution core processor.

FIG. 6 is a flowchart representing one embodiment of a mechanism 600 for recovering from an error detected in an execution core designated as the slave execution core. Operations of the slave execution core are shown on the left, and operations of the master execution core are shown on the right.

Routine 600 is initiated if the slave execution core detects 610 an error (parity, ECC, etc.). The slave core triggers 620 an interrupt to signal the error condition to other components of the computing system. For embodiments of routine 600 implemented by PAL or comparable processor-level code, broadcast of the interrupt signal may be limited to components within the processor chip, such as the master execution core. In addition to signaling the error, the slave execution core disables 630 the FRC unit and suspends its activities. Disabling the FRC unit prevents the error from triggering an FRC reset when it reaches the FRC boundary, and suspending activities in the slave core prevents it from disrupting the recovery process.

In response 624 to the interrupt, the master execution core determines 640 whether its state data contains any errors. For example, each execution core may include a status bit that is set if an error is detected. The master execution core may check this bit to determine if it has also generated an error. Except for the very rare case in which soft errors occur in both execution cores almost simultaneously, the master core is likely to be clean. If it is not clean 640, there is no uncorrupted processor state with which to implement a recovery. In this case, the master core signals 642 a reset condition to the slave core and the computing system executes 644 a full, e.g. FRC-level, reset.

If the state data for the master core is not corrupted, the master core saves 660 its machine state and flushes 664 queues and buffers in its pipeline. For example, the master core may save the contents of its data and control registers and low-level cache(s) to a protected area of memory. The master core also signals 668 a limited reset to the slave core and sets 676 it resources to a specified state, e.g. initializes its pipeline. The slave core detects 670 the limited reset and initializes 674 its pipeline, synchronizing the states of the cores.

With the cores thus synchronized, FRC mode is reactivated 680. This may be accomplished, for example, by having each core execute a handler routine, which sets appropriate state bits in its status/control registers. The saved state is restored 684 to both execution cores, and control is returned 690 to the interrupted code sequence.

Method 600 represents an embodiment of the recovery mechanism for the case in which the error is detected in the execution core that is currently designated as the slave core. For one embodiment, the slave core is the execution core that does not "control" the shared resource(s). For example, in FRC mode, signals from the slave execution core are dropped following comparison with those from the master execution core at the FRC boundary. If no FRC error is detected, signals from the master core are used to control the shared resources outside the FRC boundary.

If the error originates in the master core rather than the slave core, recovery may be handled by changing the master/slave designations of the execution cores. For example, master/slave designation may be indicated by the state of a bit in a status register associated with each execution core. The execution core for which this status bit is in the master state controls the shared resources, which are used to implement the state-saving operations of recovery routine 600, e.g. operation 660.

For one embodiment of the recovery routine, the execution core in which the error originates may check its master/slave status bit. If the status bit indicates it is the slave, method 600 may be implemented as described. If the status bit indicates it is the master, it may signal the slave to change its status to master, change its own status to slave, and suspend activities.

Figure 7:
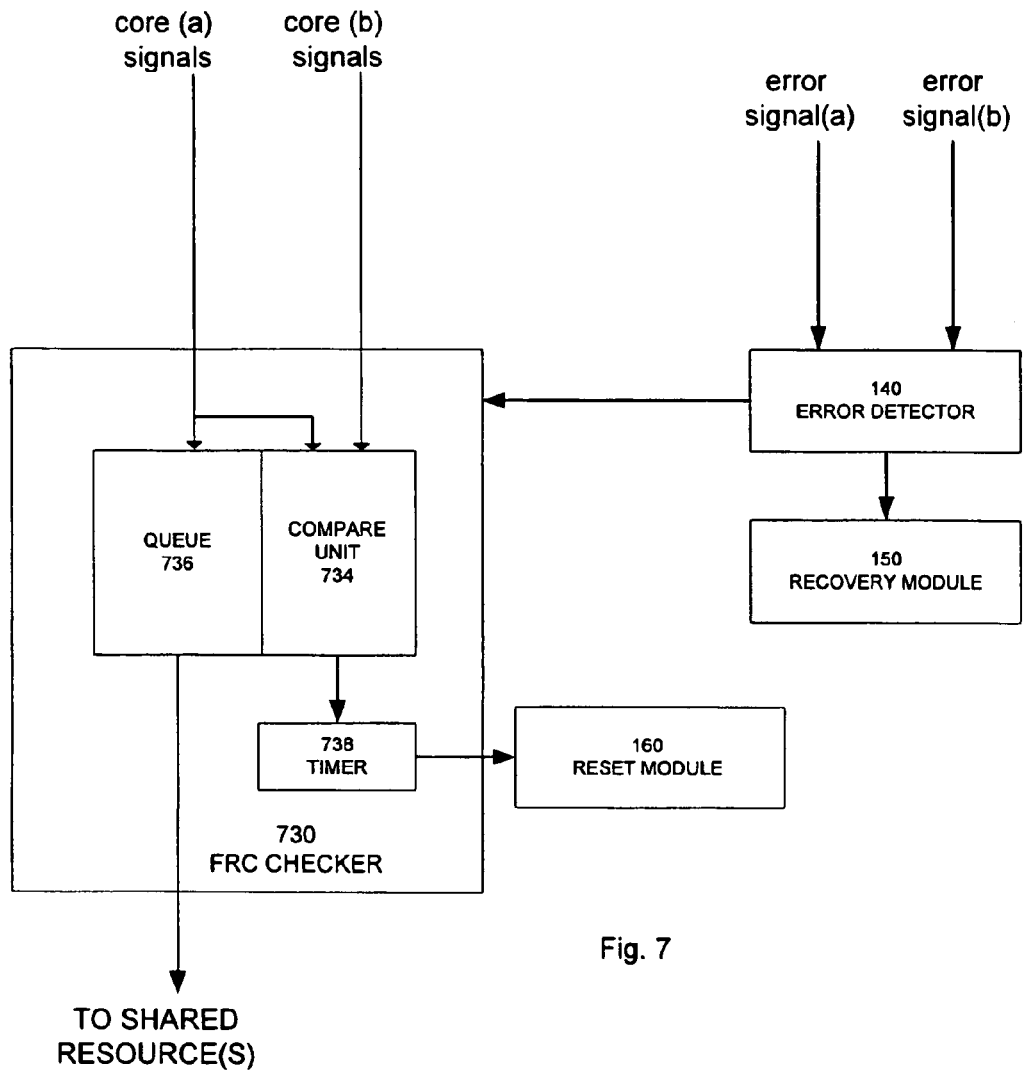
FIG. 7 is a block diagram representing one embodiment of an FRC checker that mitigates race conditions between recoverable and non-recoverable error mechanisms.

FIG. 7 is a block diagram illustrating an embodiment of an FRC-checker 730 that mitigates race conditions between recoverable and non-recoverable error handling. The disclosed embodiment of FRC checker 730 includes a compare unit 734, queue 736, and timer unit 738. Queue 736 receives data from execution core (a), and compare unit 734 compares the data from cores A and B, and sets a status flag to indicate if the comparison yields a match. If the data matches, the status flag is set to indicate the match.

If the data does not match, the status flag is set to indicate the mismatch and timer unit 738 is triggered to begin a countdown interval. If error detector 140 receives an error flag before the timeout interval expires, it disables FRC checker 730 and triggers recovery unit 150 to implement the recovery routine.

There has thus been disclosed a mechanism for handling recoverable and non-recoverable errors in multi-core processor. The multiple cores may be operated in FRC mode, in which case, one or more checker units compare signals from the cores to detect non-recoverable errors. In addition, each core includes an error unit to detect recoverable errors. If a recoverable error is detected, the checker units are disabled and a recovery routine is implemented. A multi-core mode embodiment of the multi-core processor may include an arbitration unit, proximate to the checker, to control access to the shared resource(s). Proximity of the FRC boundary to the shared resources increases the logic protected by the FRC boundary and reduces wiring necessary for the multi-core mode implementation.

Embodiments of the present invention detect virtually all errors that are undetected in non-FRC-enabled systems, and they support recovery of virtually all detectable errors, including those that are typically handled through reset in other FRC-enabled processors.

The disclosed embodiments have been provided to illustrate various features of the present invention. Persons skilled in the art of processor design, having the benefit of this disclosure, will recognize variations and modifications of the disclosed embodiments, which none the less fall within the spirit and scope of the appended claims.

We claim:

1. A processor comprising:
   first and second execution cores to operate in an FRC mode, wherein the first and second execution cores may also operate in a multi-core mode;
   a resource to process a transaction from at least one of the first and second execution cores;
   an interface control unit to regulate access to the resource by the first and second execution cores, the interface control unit including,
      an FRC check unit to compare transaction signals from the first and second execution cores and to signal an error if the comparison indicates a mismatch, and
      an arbitration unit to regulate access to the resource by the execution cores if they operate in multi-core mode; and
   an error detector to detect an error in the first and second execution cores respectively and to disable the FRC check unit responsive to detecting an error.

2. The processor of claim 1, wherein the error detector comprises first and second error detectors to detect errors in the first and second execution cores, respectively.

3. The processor of claim 2, wherein the first error detector triggers an error signal, responsive to an error in the first execution core, to disable the FRC check unit and to initiate a recovery procedure using the second execution core.

4. The processor of claim 3, wherein the second execution core is designated as an FRC slave and is re-designated as an FRC master, responsive to the error signal.

5. The processor of claim 4, wherein the second execution core saves its machine state data to a memory location, and executes a reset sequence.

6. The processor of claim 1, wherein the resource comprises a cache that may process transactions from both the first and second cores in multi-core mode and that may process transactions from only one of the first and second core in FRC mode.

7. The processor of claim 1, wherein, responsive to detecting an error, the error detector triggers an interrupt if the processor is in multi-core mode and an accelerated interrupt if the processor is in FRC mode.

8. The processor of claim 7, wherein the accelerated interrupt bypasses portions of an execution core traversed by the interrupt in multi-core mode.

9. A system comprising:
   a first memory location to store a recovery routine;
   a second memory location to store a reset routine;
   first and second execution cores capable of operating in an FRC mode;
   an error unit to initiate the recovery routine responsive to detecting an error in one of the first and second execution cores, wherein the error unit disables the FRC checker, responsive to detecting the error in one of the first and second execution cores; and
   an FRC checker to initiate the reset routine responsive to detecting a mismatch between signals from the first and second execution cores, wherein the reset routine includes instructions executable by the first and second execution cores to initialize the first and second execution cores in either a multi-core mode or the FRC model;
   a cache to be shared by the first and second execution cores if the first and second execution cores are initialized in multi-core mode; and
   an arbitration unit to manage access to the cache by the first and second execution cores in multi-core mode.

10. The system of claim 9, wherein the FRC checker monitors transaction signals to the arbitration unit from the first and second execution cores in FRC mode and initiates the reset routine responsive to a mismatch in the transaction signals.

11. The system of claim 9, wherein the first and second execution cores operate as master and slave, respectively, in an FRC mode.

12. The system of claim 11, wherein the first execution core is disabled and the second execution core operates as the master, responsive to an error in the first execution core.

13. The system of claim 9, wherein the first and second execution cores may be initialized in a multi-core mode or an FRC mode.

14. The system of claim 13, wherein the error unit triggers an interrupt to the first and second execution cores, responsive to an error in one of the execution cores.

15. The system of claim 14, wherein the interrupt is an accelerated interrupt if the execution cores are in FRC mode.

16. The system of claim 15, wherein the accelerated interrupt bypasses a portion of the execution core.

* * * * *

UNITED STATES PATENT AND TRADEMARK OFFICE
CERTIFICATE OF CORRECTION

| | |
|---|---|
| PATENT NO. | : 7,055,060 B2 |
| APPLICATION NO. | : 10/324957 |
| DATED | : May 30, 2006 |
| INVENTOR(S) | : Nguyen et al. |

Page 1 of 1

It is certified that error appears in the above-identified patent and that said Letters Patent is hereby corrected as shown below:

In column 8, at line 1, delete "10" insert --110--.

In column 10, at line 57, delete "model" insert --mode--.

Signed and Sealed this

Fifteenth Day of May, 2007

JON W. DUDAS
*Director of the United States Patent and Trademark Office*